US012763609B2

(12) United States Patent
Slepoy et al.

(10) Patent No.: US 12,763,609 B2
(45) Date of Patent: Oct. 13, 2026

(54) EFFICIENT WIRELESS POWER RECEIVER

(71) Applicant: Wi-Charge Ltd., Rehovot (IL)

(72) Inventors: Alexander Slepoy, Chandler, AZ (US); Yan Rosh, Tel Aviv (IL); Lilach Stein, Rehovot (IL); Gregory Heifetz, Rehovot (IL); Nir Simon, Kibbutz Ein Hashofet (IL); Eli Zlatkin, Tel Aviv (IL); Ortal Alpert, Ness Ziona (IL); Lior Golan, Ramat Gan (IL)

( * ) Notice: Subject to any disclaimer, the term of this patent is extended or adjusted under 35 U.S.C. 154(b) by 8 days.

(21) Appl. No.: 19/110,832

(22) PCT Filed: Sep. 12, 2023

(86) PCT No.: PCT/IL2023/050984
§ 371 (c)(1),
(2) Date: Mar. 12, 2025

(87) PCT Pub. No.: WO2024/057308
PCT Pub. Date: Mar. 21, 2024

(65) Prior Publication Data

US 2026/0088660 A1 Mar. 26, 2026

(30) Foreign Application Priority Data

Sep. 12, 2022 (IL) .......................................... 296443

(51) Int. Cl.
*H02J 50/30* (2016.01)
*H04B 10/80* (2013.01)

(52) U.S. Cl.
CPC ............ *H02J 50/30* (2016.02); *H04B 10/807* (2013.01)

(58) Field of Classification Search
CPC ............................... H02J 50/30; H04B 10/807
(Continued)

(56) References Cited

U.S. PATENT DOCUMENTS 10,044,218 B2 * 8/2018 Tiefnig ..................... H02J 7/35
2006/0261253 A1 11/2006 Arao
(Continued)

FOREIGN PATENT DOCUMENTS

CN 112510855 A 3/2021
CN 114884183 A 8/2022
(Continued)

OTHER PUBLICATIONS

International Search Report for International Application No. PCT/IL2023/050984 mail date Dec. 10, 2023, 10 pages.

*Primary Examiner* — Michael R. Fin
(74) *Attorney, Agent, or Firm* — Daniel J. Swirsky; AlphaPatent Associates Ltd.

(57) ABSTRACT

A two-mode DC/DC converter systems, for use in wireless power transmission receivers, and which allow the use of conventional logic circuits, operating at voltages well over IV, to efficiently drive DC/DC converter circuits even while being powered from the low voltage, even below IV, of a photovoltaic cell output. Two separate control modules may control the DC/DC converter, a first using a simple control for switching the converter, capable of being powered by the low voltages generated by the PV. Once a voltage above about 1.5V is generated at the output of the DC/DC converter, a second, more complex controller can become powered up, and takes control of the voltage conversion process, driving the converter more efficiently, and able to adapt its control function according to logical input instructions and sensor outputs received. The complex controller can operate independently, or in conjunction with the simple controller, to increase efficiency further.

20 Claims, 3 Drawing Sheets

(58) Field of Classification Search
USPC .................................................. 307/151, 104
See application file for complete search history.

(56) References Cited

U.S. PATENT DOCUMENTS

| | | | |
|---|---|---|---|
| 2015/0194877 | A1 | 7/2015 | Hsiao |
| 2016/0134134 | A1 | 5/2016 | Baarman |

FOREIGN PATENT DOCUMENTS

| | | | |
|---|---|---|---|
| EP | 3846420 | A1 | 7/2021 |
| WO | 2024057308 | A1 | 3/2024 |

* cited by examiner

EFFICIENT WIRELESS POWER RECEIVER

RELATED APPLICATIONS

This application is a national phase application filed under 35 USC § 371 of PCT Application No. PCT/IL2023/050984 with an International filing date of Sep. 12, 2023, which claims priority of IL Patent Application 296443, filed Sep. 12, 2022. Each of these applications is herein incorporated by reference in its entirety for all purposes.

FIELD

The present disclosure describes technology related to the field of receiver design in a system for wireless power transmission, especially technology for optimizing the efficiency and operation of such a receiver over all phases of its operation.

BACKGROUND

Wireless power delivery systems, in which a transmitter sends electromagnetic power in the form of a beam, from the transmitter to a remote electronic device, are well known in the art. The remote electronic device can comprise a receiver for receiving and controlling the power received, and an apparatus for using or storing the power received. Such systems are described in Patent Publications and patents WO 2007/036937 for "Directional Light Transmitter and Receiver", WO 2009/083990 for "Wireless Laser Power Transmitter", WO 2012/172541 for "Spatially Distributed Laser Resonator", WO 2017/009854 for "A System for Optical Wireless Power Supply", WO2017/033192 for "Wireless Power Distribution System", WO 2017/158605 for "System for Optical Wireless Power Supply", WO 2017/179051 for "System for Optical Wireless Power Supply", WO/2019/135226 for "Multiple Beam Wireless Power Transmission System", and U.S. Pat. No. 11,444,491 for "Wireless Power Transmission System", all commonly owned by the present applicant. These systems consist of a transmitter generating a power beam, generally a laser beam, and receivers converting the beams into usable electrical power for use by client devices or for storage for such use, or for another electronic circuit which is not part of the receiver The transmitter typically includes a beam generator, a beam deflection system used to aim the beam at a receiver, and should, in most cases, also include a safety system. The safety system often relies on feedback from the receiver, indicating that the power beam has been received, and assisting in centering the beam on the receiver power absorption element, and in conveying identification data on the receiver back to the transmitter, so that any safety diversions from the planned transmission can be detected and corrected. Such a communication channel is often termed a "back channel", or a "feedback channel", or a similar term, and uses a signal emitter on the receiver for transmitting the feedback information, and a signal detector on the transmitter for receiving the feedback information from the receiver.

The main function of the receiver is to generate power for use by other systems or components, or for energy storage for present or future use. Such other systems may include products such as mobile phones, or laptop computers, or products which use remote wireless charging rather than being connected to the mains supply or having replaceable batteries installed. The receiver is often built into the product or device to which it is designed to supply power, and part of the receiver components may be situated on the same subsystem as components of its client device or product, or they may be distributed around the client product or device. The term "client" is used herewithin to describe the product or device which is the ultimate user of the wireless transmitted power In light of these delineations, the receiver is therefore distinguished from any other parts of a product into which it may be integrated, or with which it may be intended to operates, in that the receiver is that part of such an integrated product that receives the transmission from the power transmitter, and handles and processes the power received up to the point where the power is either stored in a storage device, such as a battery or capacitor, or is fed to be used by the product into which the receiver is built or with which it is associated. All other parts of such a product come under the heading of "client", especially as related to the ultimate use of the power.

The disclosures of each of the publications mentioned in this section and in other sections of the specification, are hereby incorporated by reference, each in its entirety.

SUMMARY

The present disclosure attempts to provide novel systems and methods that overcome at least some of the disadvantages of prior art systems and methods. The present disclosure describes new exemplary receiver configurations, for use in wireless power transmission systems, having a higher efficiency than currently used receivers, such that the overall power transmission efficiency is increased. Though these new receiver configurations are advantageous for any receiver whose function is to transfer wireless energy to the receiver client device, they are especially advantageous for systems which do not include a permanent power source such as a battery, and are powered, in the case of an optical power beam, solely by the laser beam illuminating the optical-to-electrical power converter, which is typically a photovoltaic cell. Additionally, these new configurations are also useful in cases where the battery cannot be used to provide power to the internal components of the receiver, such as when the battery is external to the receiver, or is seriously depleted.

Although the most common form of local wireless power transmission is for optical transmission using a laser beam, and that is the example which is used in this disclosure as illustrative of such wireless power receivers, it is to be understood that the receivers described and claimed in this disclosure are intended to cover all forms of wireless power transmission and reception, including radio-frequency electromagnetic wave transmission, using antennae for the reception process.

In general, receivers include a number of electronic subsystems or components, having the following functions:

(a) An energy converter for converting the electromagnetic beam into electrical energy, this being achieved in the case of optical power transmission by use of a photovoltaic (PV) cell or array. The optical case with a PV will be used as the exemplary implementation throughout this disclosure, though it is to be understood that the receivers described herein are not intended to be limited to optical receivers.

(b) A Maximum Power Point Tracking (MPPT) circuit or similar circuit, to optimize power extraction from the photovoltaic energy converter. Although such an optimization generally takes the maximum power point into account, it may also take into consideration other factors such as safety, voltage limits of the PV, temperature limits of the PV, required output voltage and the availability of a battery, and especially the overall safety and efficiency of the system, in order to set the reference load applied to the PV for optimal operation conditions. For the MPPT case, such a circuit is required since the efficiency of power transfer from the PV cell depends on the power level and extent of focusing of the incident beam, the temperature of the PV cell, and the electrical characteristics of the load fed by the incoming power. As these conditions vary, there is a change in the load characteristic and the load impedance that provide the highest power transfer. The system is optimized when the load characteristic changes to keep power transfer at highest efficiency. MPPT is the process of adjusting the load characteristic as the source conditions change, and as the load conditions change. A well designed MPPT circuit presents optimal loads to the photovoltaic cell and then converts the voltage, current, or frequency to suit other devices or systems. However the optimization circuit may alternatively be designed to optimize for maximum system efficiency instead of maximum PV efficiency taking into account DC/DC conversion, PV temperature or fluorescence yield as well as other factors.

(c) One or more sensors to measure the power generated by the receiver, the incoming beam characteristics, any safety related parameters, and in some cases, also other parameters.

(d) A DC/DC converter circuit to convert the voltage of the power generated by the PV cell, to a voltage level which is more useful for efficient operation of conventional electronic circuits. An IR optimized PV cell usually outputs current at a low voltage, typically less than 1 V, which is well below the voltages required for operation of electronic semiconductor devices, and especially digital electronic components in logic circuits. MPPT optimization typically dictates generating a voltage which changes based on operational conditions, but this voltage may be unsuitable for many electronic circuits. For example, if 1 W of electrical power is converted by the MPPT circuit into 5V, it would yield 1 W at 5V (ignoring losses due to the conversion process). However, if the client device, including any energy storage devices and load components, require only 0.5 W at 5V, it is important to continue to supply the power at 5V, in order to avoid damage to components of the client device. Consequently, operation at the maximal power point becomes impossible, and the DC/DC conversion should be performed independently of the MPPT. The DC/DC converter is a boost converter, adapted to output current at a voltage enabling operation of electronic circuits at a high level of efficiency, usually at 5V, but also often at 1.7V, 3.7V. 7.6V, 12V, or other voltages typically specified for certain electronic circuits.

One of the problems which wireless power receivers have to contend with, is that the amount of power that they receive from the transmitted wireless power is limited, variable and unpredicted, since it is dependent on reception of a beam from the transmitter. In particular, in order to conserve on-board stored power, the receiver is generally in a sleep mode, or even turned off, and therefore requires a minimal input energy in order for it to wake up and begin to receive the transmitted power. Such a wake-up process, using a first minimal amount of energy, is described in International Patent Publication WO2017/033192 for "Wireless Power Distribution System", commonly owned by the present applicant. Additionally, when the transmitter is searching for a receiver to which to send wireless power, until the point when the transmitted beam is locked onto a receiver which it has found during its scanning process, the level of power transferred to the receiver is very low, and the output voltage of the PV cell is therefore also low. As a result, there exists a problem that receivers may initially operate at very low efficiency and are thus unable to speedily achieve a level of output power, in accordance with the power transmitted to them by the transmitter.

An optical-to-electrical power converter typically generates less than 1V. Most currently available digital electronic components, and especially logic circuits, need a higher voltage to operate. Because of this limitation, and because of the very limited availability of components that do operate at such low voltages, especially logic components, prior art receiver controllers have generally been powered by the output of the DC/DC converter, rather than directly from the PV cell. It is still very difficult to design an efficient circuit having a controller powered from the voltage generated by the photovoltaic cell without DC/DC conversion.

Simple converters have low efficiencies, and offer only limited control over their output voltage. On the other hand, more complex, logic-based DC/DC converters, which have higher current conversion efficiencies, and are therefore much more beneficial for use in wireless powered systems, require voltages of significantly more than 1V to operate, and such voltage levels are not generally available from the PV cell. This is especially so during search and start-up procedures, and also especially for use in systems which have no additional voltage source such as an on-board battery, and which thus rely only on the power received from the wireless power transmission system.

The present disclosure describes novel DC/DC converter systems, for use in wireless power transmission receivers, and which allow the use of conventional logic circuits, operating at voltages well over 1V, to efficiently drive DC/DC converter circuits and an MPPT, or similar optimization circuits, even while being powered only from the low voltage PV output.

The current systems achieve this by using two separate control modules for controlling the DC/DC conversion function. A first initial voltage conversion is performed by using a simple basic control module, either analog or digital, to control the operation of the switching procedure of the converter. Because such a simple control module, which can be as basic as a predetermined fixed frequency source, or a signal generator, whether outputting a pulsed or a sine-type of signal form, or a function generator, can be implemented without the inclusion of electronic logic functions, it has the advantage that it is capable of being powered by voltages significantly below 1.5V, or even below 1 V, these being the levels of voltages generated by the PV. However, such a simple switching control of the converter results in a less than optimal conversion efficiency, and furthermore, does not have any logic-based adaptive characteristics to enable it to adapt to changing conditions, such as changes in power or environmental changes. Throughout this disclosure, such simple control systems, are termed simple or basic control modules or features, to distinguish them from more complex control systems that include logic circuit functions.

Once a voltage above about 1.5V is generated at the output of the DC/DC converter, a second, main controller, can now become powered up from this higher voltage, and takes control of the voltage conversion process. Since this main controller is now being powered by a suitably higher voltage, it will drive the converter in a more efficient manner, and also has the ability to adapt its control function according to logical input instructions it receives. Since such a main controller, operating from a higher voltage, can be more complex than the simple first stage controller, it can incorporate logical function circuits, and can receive sensor inputs, and based on those inputs, generate computed output instructions. Thus, it can be designed to adapt to various different parameters, such as current requirements and availability, desired output voltage, client device requirements, environmental or operating temperatures, and other variable parameters, while still providing the desired output to the client device, and at a stable level.

The first, lower efficiency simple controller mode, is thus a temporary mode, capable of operation directly from the PV, even while the PV is outputting a low voltage, such as from a low power scanning mode of the transmitter. During the operation of the low efficiency controller, many of the receiver subsystems are either off, or in power saving mode, sleep mode or at least a waking up mode, during which they are turned on. Such systems include the back-channel transmission system, ADC, and the main controller. In many cases even the client device may be disconnected from the output of the DC/DC converter during this first stage.

The second, high efficiency controller mode, is the mode the converter operates in, once it has been fully powered up and is supplying power to the client device. In this mode, most of the power generated is supplied to the client, while only a smaller portion of it is used to operate the power receiver itself, with all of its appended sub circuits such as the aforementioned back-channel link, the power conversion function itself, the MPPT circuitry, and other functions which will be described more fully in the detailed description section hereinbelow.

The receivers of the present disclosure thus achieve their higher efficiency by implementing two modes of operation for the voltage converter functionality, a low efficiency mode followed by a high efficiency mode. Each of these modes has its own characteristics and distinct functionalities.

The low efficiency mode is characterized in at least some of:

(a) the DC/DC converter switch is operated by a circuit which is powered by the PV;

(b) the back-channel communication system is inoperative;

(c) the main controller is off or is sleeping at the beginning of this low efficiency mode, and only turns on when this mode is complete or close to completion;

(d) the system analog to digital circuit (ADC) is off at the beginning of this mode, and only turns on when this mode is complete or close to completion; and (e) the client device may be, in some cases, disconnected from the output of the DC/DC converter.

The high efficiency mode is characterized in at least some of:

(f) the main controller is on, and is powered either by the output of the inductor of the DC/DC converter, when only a single inductor/switch converter assembly is used, or by the output of the inductor of the second stage DC/DC converter, where such a second converter circuit is used;

(g) the back channel may be on, or is turned on from time to time, powered by the output of the inductor of the first stage, at least periodically;

(h) the ADC is powered by the output of the inductor of the first stage, and is on, at least periodically; and (i) the client device receives most of the energy generated by the PV and most of the energy generated at the output of the inductor whether a single stage inductor or the inductor of the second stage, where both stages have their own switching circuits.

The low efficiency initial mode typically ends after a voltage greater than 1V has been generated, and the main controller has completed a self-check routine.

Once the main controller is operational, it performs a self-evaluation, making sure that subsystems perform without failure, turns on at least one ADC, and typically uses a multiplexer system (MUX) to measure the value of various sensors, such as a sensor for measuring the current or voltage or power generated by the photovoltaic cell, or a sensor for measuring the power of the optical beam impinging on the photovoltaic cell, or a sensor for measuring the temperatures of various components, such as the photovoltaic cell or the controller itself.

The ADC, and typically the amplifiers for the sensors are typically powered by the output of the inductor of the first stage during the high efficiency second stage.

The main controller then uses the data measured, as well as parameters such as the desired output voltage to calculate the rate and duty-cycle of switching that needs to be applied to the main controller switch, optionally disconnects the initial simple controller module for those implementations which utilize the second stage conversion only, as will be explained in the Detailed Description section hereinbelow, and drives the converter switch itself. In an alternative transition to the main controller, it may first take over functionality, and only then measure parameters and optimize operation.

Once stable operation has been reached, using the main controller, the main controller causes subsystems such as the ADC circuit, the MPPT circuitry, and the signal emitter for the back channel to begin operation, using the power generated by the inductor of the first stage DC/DC converter.

At this stage the controller can send a data packet back to the transmitter using the signal emitter and the back channel communication link, such that the transmitter can send to the receiver a desired and safe level of power. The controller may also send data regarding the receiver temperature, and when the receiver temperature exceeds a threshold, the transmitter is designed to withhold power from the receiver for a short time, to allow the temperature to decrease, and then power it on again.

Depending on the electrical power measured, (typically using the MUX and) using the ADC, the controller can cause the signal emitter to transmit a packet at least every $$\frac{1}{3P^{4/3}}$$

seconds, where P is the electrical power generated by the power converting element measured in watts. This is important to allow stable reporting of a “keep alive” signal to the transmitter.

The average power loss in the inductor, and the average power loss in the switch are influenced by the signal driving the switch. Hence an optimized signal, such as the driving signal generated by the main controller, which would be based on measurements of the various sensors, would yield higher conversion efficiency from the same inductor and the same switch, than when driven by the simple controller. However, in some designs it is more advantageous to use two sets of inductor and switches, as will be described hereinbelow, in the Detailed Description.

During the second stage, the main controller optimizes the driving signal, the timing of the signal emitter, and the power mode of the ADC such that the power loss on the coil, plus the power loss on the switch, plus the power consumed by the signal emitter, plus the power loss used in actuating the MTTP circuit, if used, should be less than 50% of the power generated by the DC/DC converter circuit, as emitted by the inductor, and hence certainly less than 50% of the power generated by the optical to electrical converter. This can be expressed by the expression:

$$(Pmppt+Pcoil+Pswitch+Pse)/Pdcdc<0.5$$

where

Pmmpt is the power used to power the MPPT circuit, if included;

Pcoil is the average power loss on the inductor during operation;

Pswitch is the average power loss on the switch during operation;

Pse is the power used by the signal emitter; and

Pdcdc is the power generated by the DC/DC converter circuit.

When the power generated by the photovoltaic optical-to-electrical converter drops, the main controller is programmed to reduce the power loss on at least some of the inductor, the switch, the ADC circuit, the controller itself and the signal emitter, in order to improve the percentage of power delivered to other circuits, and specifically to the client circuit, which is the object of the receiver function. As previously stated, the receiver should supply at least 50% of its output to supply the client device, if needed. In achieving this object, account must be taken of the situation where the power available from the wireless power transmission is lower than optimum, or even significantly lower than the optimum power transmission. Under such circumstances, a lower level of power is budgeted for the ancillary tasks needed in enabling the supply of output power from the receiver. This lower level of power may be in absolute terms and not as a percentage of the power output. This saving of non-directly used output power may be achieved by at least some of:

(i) Reducing the back channel power, or even the number of data bits sent by the back channel link to the transmitter.

(ii) Reducing the duty cycle of MPPT or ADC tests.

(iii) Reducing the duty cycle of safety tests.

(iv) Reducing the duty cycle at which the controller is operated at a higher power consumption mode.

(v) Reducing the duty cycle at which auxiliary systems, such as the ADC, are operative.

(vi) Saving power on the DC/DC conversion process, by use of an optimized system, tailored to the lower available power.

There is thus provided in accordance with an exemplary implementation of the devices and systems described in this disclosure, a receiver for converting an optical power beam into electrical power for use by an electronic system, the receiver comprising:

(i) a power converting element adapted to convert the optical beam power into an electrical current at a first voltage, (ii) a signal emitter adapted to transmit information regarding the operation of the receiver, back to a system transmitting the optical power beam, and (iii) a voltage converting circuit adapted to convert the electrical current having the first voltage into a current having a second voltage higher than the first voltage, the voltage converting circuit comprising at least one inductor and at least one switch, the at least one switch being continuously switched between Open and Closed positions by a signal from at least one of a first electronic switching module and a second electronic switching module, the electronic switching modules being characterized in that:

the first electronic switching module is adapted to switch the at least one switch in a first mode, at a rate and duty cycle provided by a signal generating circuit, the first electronic switching module being powered by the electric power output of the power converting element, the second electronic switching module is adapted to switch the at least one switch in a second mode at either or both of a variable rate and a variable duty cycle provided by at least one controller according at least to the requirements of the receiver, the second electronic switching module being powered by the electric power output of the voltage converting circuit, and the second electronic switching module is adapted to begin operation only when the voltage of the current output from the voltage converting circuit exceeds a predetermined threshold, and wherein:

(iv) the signal emitter may be powered by the output of the voltage converting circuit, (v) the signal emitter may be adapted to begin operation only after the voltage of the current output from the voltage converting circuit exceeds a predetermined threshold, and (vi) the signal emitter may be adapted to begin operation only after receiving a signal from the at least one controller.

In such a receiver, operation of the second electronic switching module at the second voltage may enable the second electronic switching module to actuate the voltage conversion circuit at a higher conversion efficiency than the power conversion efficiency of the voltage conversion circuit operated in the first mode by the first electronic switching module.

In such receivers, the higher conversion efficiency of the voltage conversion circuit actuated by the second electronic switching module may be achieved at least because the higher level of the second voltage compared to the first voltage enables operation of semiconductor switching devices within the second electronically operated switch module at a lower closed resistance than the closed resistance of the switching devices in the first electronic switching module.

Additionally, the conversion efficiency of the voltage conversion circuit actuated by the second electronic switching module, being higher than the conversion efficiency achieved by use of the signal generating circuit in the first electronic switching module, may be achieved at least because of more efficient control of the required switching parameters, by use of the at least one controller to adapt the switching parameters to the receiver requirements.

In any of the above-described receivers, the at least one inductor may be common to both the first electronic switching module, and the second electronic switching module. In that case, the at least one controller should be adapted to prevent the first and second electronic switching modules from operating the at least one switch simultaneously.

Furthermore, in any of the above-described receivers, the at least one controller may be adapted to output a disable signal to terminate operation of the signal generating circuit of the first electronic switching module, when the second voltage exceeds a predetermined second threshold level.

In an alternative implementation of the above-described receivers, the first electronic switching module, and the second electronic switching module may operate with separate inductors. In such a case, the use of separate inductors should enable the second electronic switching modules to provide an output current at a voltage independent of the second voltage output of the voltage converter. Furthermore, the use of separate inductors enables the at least one controller to provide the first electronic switching module with the second voltage, such that an increase in efficiency of operation of semiconductor switching devices within the first electronic switching modules is achieved.

According to yet further implementations of any of the above described receivers, the signal emitter is adapted to transmit a signal containing information based on data from at least one sensor measuring at least one of:

the optical beam power received, the portion of the optical beam power absorbed by the power converting element, the output from the power converting element, the output from the voltage converting element, and the temperature of the power converting element.

In such an implementation of such receivers, the emitter may be adapted to transmit the digital signal to a transmitter generating the optical power beam, such that the level of the optical power beam transmitted to the receiver can be adjusted according to the information transmitted by the signal emitter.

Additionally, in any of the above described receivers, the emitter may be activated by the at least one controller only when the second electronic switching module has begun to operate. In that case, the signal emitter may emit the digital signal at least once every $$\frac{1}{3P^{4/3}}$$

seconds, where P is the electrical power generated by the power converting element.

Furthermore, in any of the above described receivers, the at least one controller may include a maximum power point tracking (MPPT) circuit adapted to optimize power extraction from the photovoltaic cell and the voltage converter circuit.

According to yet more implementations of such receivers, during the period when the second electronic switching module has begun to operate, operation of ancillary circuits and power losses in the receiver may be controlled such that at least 50% of the power generated by the optical to electrical converter is provided for use by the electronic system. In such a case, the ancillary circuits and power losses may include at least one of:

the maximum power point tracking circuit, the average power loss on the coil during operation, the average power loss on the switch during operation, and the power used by the signal emitter.

There is further provided in accordance with any of the above described receivers, a receiver according to any of the previous claims, adapted so that the optical power beam which the receiver converts into electricity may be a laser beam.

Furthermore, in any such receivers, the power converting element may be at least one photovoltaic cell.

Additionally, the power converting element may be a single photovoltaic cell, such that the receiver is capable of operating efficiently with either a transmitted beam having a profile with at least one hotspot, or is capable of operating with an unhomogenized beam.

There is also provided in accordance with another exemplary implementation of the methods described in this disclosure, a method for converting an optical beam of power transmitted to a receiver, into electrical power for use by an electronic system, comprising:

(i) converting the optical beam power into an electrical current at a first voltage by use of a power converting element, (ii) converting the electrical current at a first voltage into a current at a second voltage higher than the first voltage, by use of at least one voltage converting circuit, each comprising an inductor and a switch, the switch being continuously switched between Open and Closed positions by a signal from at least one of a first electronic switching module and a second electronic switching module, wherein:

the first electronic switching module is adapted to switch the at least one switch in a first mode, at a rate and duty cycle provided by a repetitive signal generating circuit, the first electronic switching module being powered by the electric power output of the power converting element, and the second electronic switching module is adapted to switch the at least one switch in a second mode at either or both of a variable rate and a variable duty cycle provided by at least one controller, according at least to the requirements of the receiver, the second electronic switching module being powered by the electric power output of the voltage converting circuit, and (iii) enabling the second electronic switching module to begin operation only when the voltage of the current output from the voltage converting circuit exceeds a predetermined threshold.

Such a method may further comprise the steps of (iv) transmitting information regarding the operation of the receiver from a signal emitter on the receiver, back to a transmission system from which the optical beam of power was transmitted, and (v) using the information to adjust the power of the optical beam transmitted to the receiver, wherein, the signal emitter is:

(a) powered by the output of the voltage converting circuit, (b) adapted to begin operation only after the voltage of the current output from the voltage converting circuit exceeds a predetermined threshold, and (c) adapted to begin operation only after receiving a signal from the at least one controller.

Either of these methods may further comprise the step of disabling the operation of the first electronic switching module, and enabling only the second electronic switching module to operate the at least one switch of a single voltage converting circuit. In such a case, the disabling of the first electronic switching module and the enabling only of the second electronic switching module to operate the at least one switch of the voltage converting circuit may be mandated by the use of only a single inductor in a single voltage converting circuit.

Alternatively, in such methods, the at least one inductor and the at least one switch may be two inductors and two switches, an inductor and a switch being associated with each of the first electronic switching module and the second electronic switching module, such that both electronic switching modules are enabled to operate concurrently, one on each of a separate voltage converting circuit.

Finally, in accordance with yet another exemplary implementation of the devices described in this disclosure, there is further provided a receiver for providing power from a transmitted beam to a device associated with the receiver, the receiver comprising:

(i) a power converting element adapted to convert the beam power into an electrical current at a first voltage, (ii) a voltage converting circuit adapted to convert the electrical current having the first voltage into a current having a second voltage higher than the first voltage, for applying to the device associated with the receiver, (iii) a comparator circuit adapted to prevent the current from the voltage converter from being applied to the device associated with the receiver, if the second voltage is above a first threshold, which is input to the comparator as the reference level, and (iv) an electronically controlled switch having a by-pass resistor, adapted to maintain a minimal current to the device associated with the receiver, if the second voltage falls below a second threshold voltage.

BRIEF DESCRIPTION OF THE DRAWINGS

The present invention will be understood and appreciated more fully from the following detailed description, taken in conjunction with the drawings in which.

DETAILED DESCRIPTION

Figure 1:
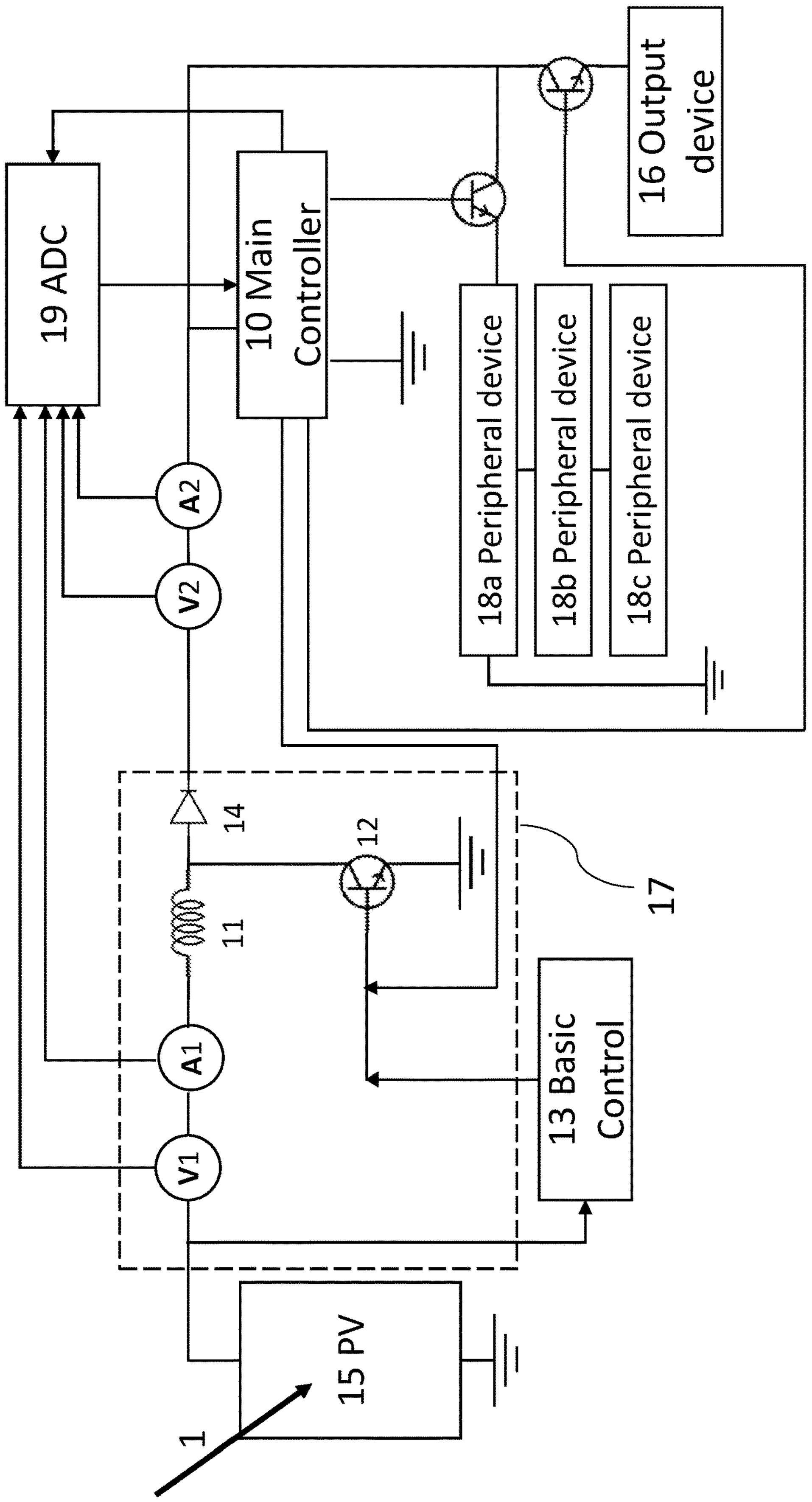
FIG. 1 illustrates schematically a typical receiver circuit according to an overall exemplary implementation of the circuits of the present disclosure, showing specific electronic components of the circuit.

Reference is now made to FIG. 1, which illustrates schematically a typical receiver circuit, including specific components of the circuit, according to one exemplary implementation of the circuits of the present disclosure. Fuller details of the receiver will be delineated hereinbelow. In the receiver circuit shown in FIG. 1, before receiving power, and during the initial stages of operation of the power reception and conversion, the main controller is shut down, since there is insufficient voltage to operate it, as are all the peripheral devices and circuits, these including circuits such as the output to the client device, any battery charging circuits, the back-channel communication link to the transmission system of the optical power to the receiver, the ADC circuitry for providing digital inputs to the main controller from the various sensors, any measurement circuits, a LED for operating an optically actuated back channel, and any other such ancillary circuit functions. In fact, the only active circuit in the receiver is that of the photovoltaic cell PV, which will provide no output current so long as no illuminating power beam is impinging on it, but which will respond to any incident illumination by generating an output current, whose voltage will depend on the intensity of the impinging power beam.

Referring now more fully to the details of the receiver, as in a prior art wirelessly powered receiver using a laser beam 1 as the source of the wireless power, the photovoltaic cell 15 (hereinafter PV) performs the optical to electrical conversion, and outputs a current A1, at a voltage V1, which, when the receiver first detects an incoming power beam 1, which could be at a very low level, is generally well below 1V. However, such a voltage level is insufficient to enable proper operation of complex logical circuits based on digital electronics. Therefore, the PV output is input into a conventional DC/DC boost converter circuit 17, comprising an inductor 11 and a transistor switch 12, in which the switch timing is operated by a basic control module 13, which could simply be a low power signal generator without any other control inputs, or with a very limited simple set of control inputs and capabilities, such that it can operate with minimum power consumption from the low output voltage of the PV 15. The switched inductor output current is rectified by a diode 14 to provide a current having a higher DC voltage V2 than the voltage output V1 from the PV cell. This simple DC/DC boost converter, which can operate at a very low power level, provides an output DC current A2 from the inductor 11 and rectifier diode 14, which is now at a voltage level V2 typically above 1V, since the DC/DC converter is configured as a boost converter, as shown in FIG. 1.

The receiver of the present disclosure differs from such prior art receivers in that this output DC current A2 is now at a voltage V2 sufficient for it to wake up and power the main controller 10 of the receiver, which includes digital logic circuits which process inputs from measurement sensors and peripheral devices, and provides control outputs to other peripheral devices or circuits of the receiver, and also an output current to the receiver client circuit 16. However, no less important is that by operating the main controller 10 at a higher $V_{DD}$, the entire power conversion process, from the input optical power to the desired output power, can now become more efficient. In effect, the main controller 10 now takes over from the basic controller 13, control of the simple DC/DC boost converter 17, from which it was initially powered. The main controller 10, having full logical control functions, can now compute the optimum duty cycle and optimum switching frequency of the inductor 11 of the DC/DC boost converter 17, according to the operational needs of the receiver. Such a computational ability requires a stable voltage at a higher level than the voltage V1 generated by the PV, and such a voltage is not available until the main controller 10 has begun operation. The main controller can then actuate the DC/DC boost converter 17 in an optimized mode according to the inputs and outputs of the peripheral and output devices, at every moment and situation of the receive operation. This level of operational flexibility was not easily available when the basic controller was used to switch the DC/DC converter 17. The logical functionalities of the main controller 10 are thus able to check currents flowing, voltages on various circuits, the load applied by the output device or devices, and now controls the entire power conversion process.

A particular feature of the above described electronic architecture of the receiver is that the main controller 10 is operated by the output V2 of the DC/DC converter 17, and therefore cannot operate in controlling the DC/DC converter until the converter itself is operating using the basic controller 13. Thus, even though the main controller 10 is operated by the output of the DC/DC converter 17, it also acts as the main control input to the DC/DC converter 17, once the high power main controller mode has commenced to operate.

As shown in FIG. 1, the main controller provides outputs to or receives inputs from a number of other circuits and peripheral devices. Such peripheral devices include an analog to digital converter circuit, ADC 19, used for converting analog signals, such as, for instance, V1, A1, V2 or A2, from measurement probes or sensors to digital signals for inputting into the main controller 10. In addition, the back channel communication link and its signal source (not shown in FIG. 1, but designated Comm in FIGS. 2, 3 and 4 below) can be powered up, such that the transmitter can be instructed to provide more power to the receiver when needed. Furthermore, depending on the available power, and the power required by the client device 16, the main controller can direct current to the client device, or to its batteries or capacitors for charging. In addition, the main controller can perform complex optimization procedures on the generation of the output current, similar to those performed by an MPPT circuit, as will be further explained hereinbelow. Such complex optimization procedures could not be performed using the simple control mode in the initial stages of the boost converter operation.

It should be emphasized that the specific ancillary circuits shown in FIG. 1, and discussed hereinabove and elsewhere, are exemplary circuits, and are not necessarily part of the inventive concept of the receiver architecture of the present disclosure. There can be more or less of such ancillary circuits in a specific receiver configuration, and those shown in FIG. 1 are used to illustrate a selection of the most common or important functions of the receiver.

The manner in which a receiver of the present disclosure starts up, in the absence of any external power source for the receiver other than the impinging low power scanning laser power beam 1, can be described as follows. Before the receiver first detects a substantive incoming laser beam, the PV cell outputs a current A1 at a low wattage, not only because of the low efficiency of the electrical-to-electrical power conversion, which results in the PV not working into the most efficient load, but also because the back channel communication to the transmitter is inoperative at this stage, as it is not supplied with any voltage from the main controller. Therefore, the transmitter is precluded from operation at a higher power mode, absent an instruction through the back channel communication link. Any impinging laser beam 1 is therefore only a scanning beam looking for receivers, and having a low level of power.

Similarly other peripheral devices are also inoperative, since the DC/DC converter is not being operated by the main controller, and cannot thus provide the output voltage necessary for their operation at this initial stage. The receiver thus uses very little current, and is essentially in a sleep mode.

On detecting an impinging laser beam 1, and before being in a position to provide confirmation to the transmitter that the transmitted scanning beam has impinged on a real receiver, since the back channel communication link is still inactive, the basic controller receives a low voltage signal from the PV cell, sufficient to actuate the basic controller 13, such that the basic controller 13 can operate the DC/DC boost converter 17 in its initial mode, thereby providing sufficient output voltage so that the main controller 10 can now commence operation. Only when the DC/DC boost converter 17 provides a sufficient output to enable the main controller to start-up and drive DC/DC conversion in a more efficient manner, do the peripherals 18*a*, 18*b*, 18*c*, . . . receive an operating voltage from the converter, now operated by the main controller 10, and thus are turned on, thereby enabling the main controller to take efficient control of the DC/DC converter, providing substantially more output power than the initial mode could provide.

In order to increase the output voltage from the PV cell, some optical power receivers use multiple cells connected in series to achieve higher voltages. However, such serial PV cells have the disadvantage that they cannot withstand local hotspots in the impinging laser beam, and in order to operate efficiently, they generally require a beam which does not have any regions of the beam profile with more than typically twice the average beam intensity. When the generated laser beam is likely to have such hotspots, the receiver should be fitted with a beam homogenizer to enable transmission of the beam to such multiple cell PVs. One additional advantage of the receivers of the present application is that a single photovoltaic cell, preferably having 1-3 junctions, can be used as the optical-to-electrical power converting element, such that beam homogenization is not required in the receiver, thus achieving volume, weight and cost advantages. Since, as described above, a single PV cell produces low output voltages, generally below the minimum required to operate conventional digital electronics, the currently described receivers are specifically optimized for efficiently converting optical power received by such optical to electrical power converters, and are specifically useful for use in receiving unhomogenized laser beams for conversion to electrical power.

Figure 2:
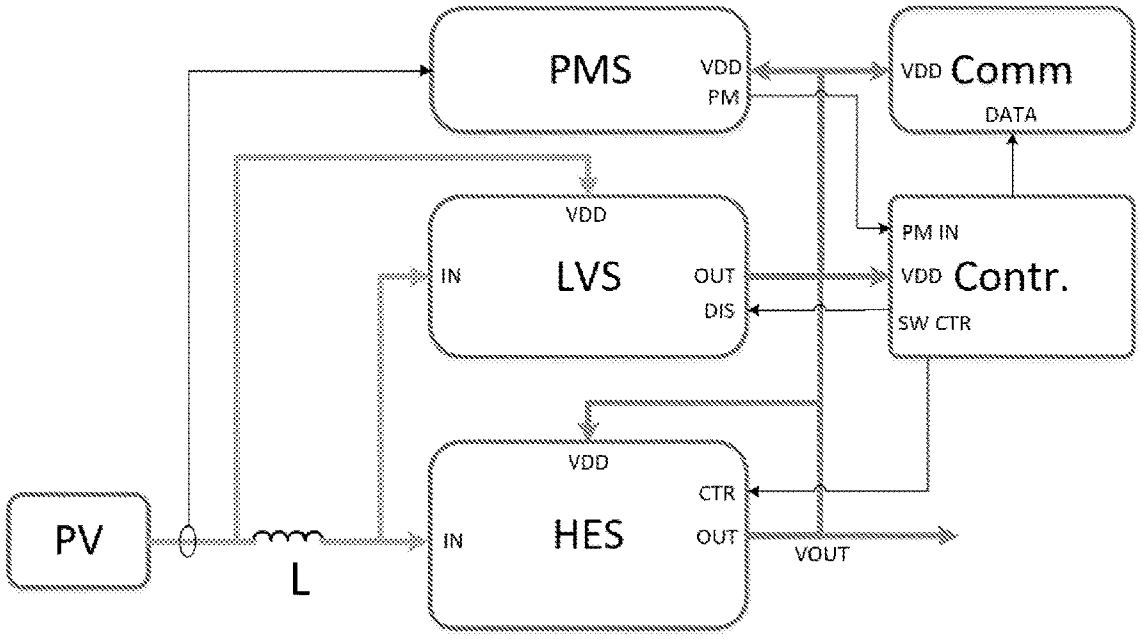
FIG. 2 is a block diagram of a first exemplary implementation of the double-stage conversion and control system of the present disclosure.
Figure 3:
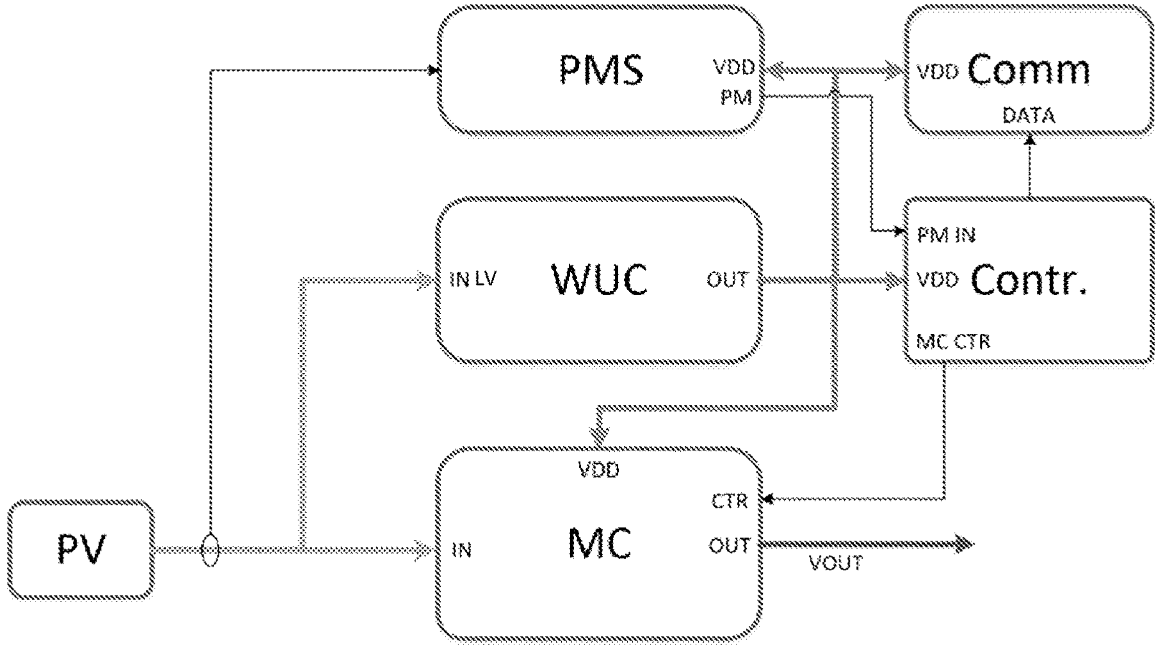
FIG. 3 is a block diagram of a second exemplary implementation of the double-stage conversion and control system of the present disclosure.
Figure 4:
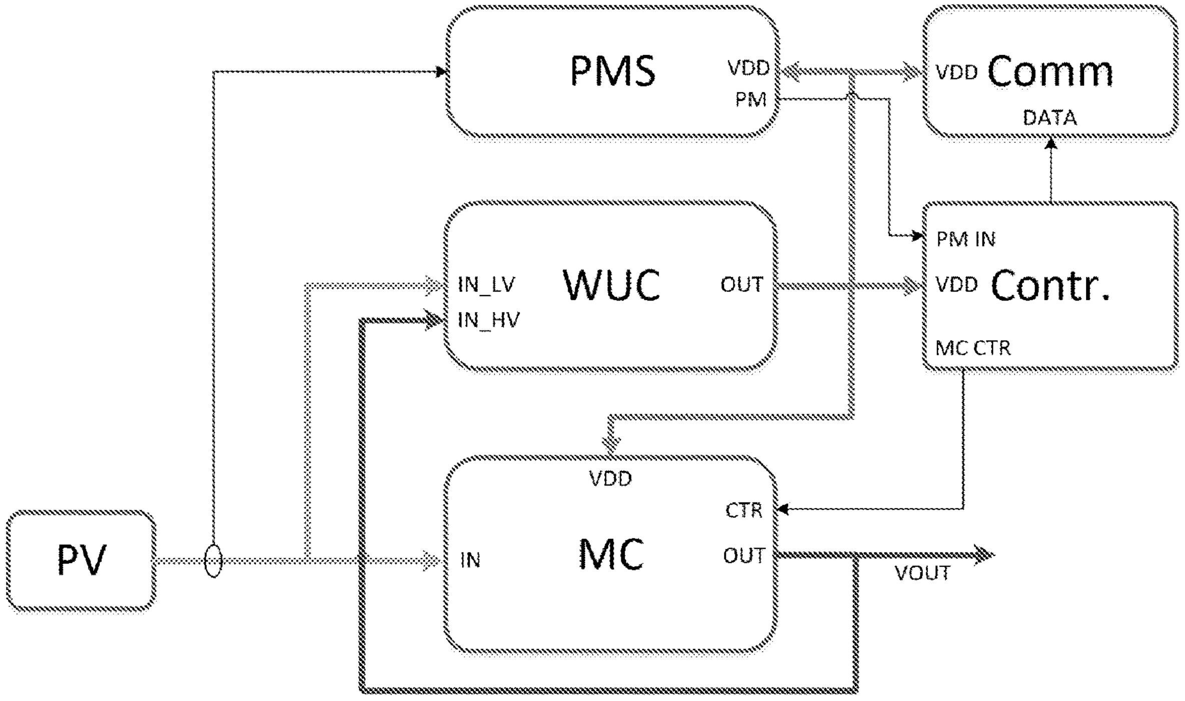
FIG. 4 is a block diagram of a third exemplary implementation of the double-stage conversion and control system of the present disclosure.

Reference is now made to FIGS. 2, 3 and 4, which illustrated schematically three different methods by which the above described receiver configurations can be achieved. These schematic block diagrams also show more of the logical paths used in sequential operation of the two separate control functions of the DC/DC boost converter 17 of FIG. 1.

FIG. 2 is a block diagram of a first implementation of the double-stage conversion and control systems. The characteristic feature of the arrangement of FIG. 2, is that the inductor of the DC/DC boost converter is a shared component, used both by the first stage control of the converter, using the basic controller 13, and then by the final stage control mode, using the main controller 10 of FIG. 1, marked Contr in FIG. 2.

In FIG. 2, the following circuit elements are shown:

LVS (Low Voltage Switcher)—This is the basic controller 13 of FIG. 1, for providing the duty cycle and frequency at which the converter is switched. It contains switches that can operate from the low driving voltage available during start-up of the receiver, a low voltage oscillator and basic control logic. The power to operate it is supplied directly from the low PV voltage, which is applied to its $V_{DD}$ input. However, the LVS has a low efficiency since the PV does not output a voltage high enough to operate the semiconductor devices in the LVS efficiently.

HES (High Efficiency Switcher)—This contains low resistance switches that need higher driving voltages, such voltages becoming available only once the main controller is brought into operation. Once the main controller Contr is operative, it supplies a disable signal DIS to the first mode controller, LVS, to switch off the LVS so that only the main controller now operates the High Efficiency Switcher to provide switching to the DC/DC boost converter. At this stage, the shared inductor L which had previously been used in the initial stage converter operation, is still used in the converter circuit. The main controller Contr can now be operated to provide optimal efficiency of the conversion process.

PMS (Power Measurement System)—includes the PV current and voltage measurement circuitry and ADC circuitry to provide digital information about the level of the current and voltage measured.

Comm (Communication link) represents the back-channel communication link between the receiver and the transmitter, to provide safe operation of the transmitter emission. The receiver end of the back channel communication link includes a signal emitter, for sending the receiver data to the transmitter.

Contr.—the main controller, which contains the control logic including a CPU that manages the complete system.

In the implementation of FIG. 2, both switchers LVS and HES share a common inductor L, which means that only one of the switching controls can be active at any point of time. The LVS powers up first, generating the high voltage for operating other modules of the system. Then the main controller Contr disables the LVS through the DIS input, and enables the HES through its CTR input, such that a high efficiency and a widely adaptable power conversion process can now be achieved. Sharing the inductor L reduces the size and cost of the system, the inductor being a comparatively bulky component.

Reference is now made to FIG. 3, which is a block diagram of a second implementation of the double-stage conversion and control systems. The characteristic feature of the arrangement of FIG. 3, is that, unlike the implementation of FIG. 2, two separate DC/DC converters are used, both of which can operate at the same time and together. Each converter then has its own set of an inductor and switches for actuating the pulse mode conversion.

In FIG. 3, the following circuit elements are shown:

WUC—the Wake-Up Converter, which is operated directly at the IN LV input, from the low voltage output of the PV, and provides the initial DC/DC boost conversion when the incident laser power on the PV is still low. The WUC is a complete self-contained DC/DC converter, albeit not of high efficiency because of its low operating voltage.

MC is the Main Converter, which also has its own set of an inductor and switches for actuating the pulse mode DC/DC conversion, but which, because it is operated using a higher voltage $V_{DD}$ input, has a high conversion efficiency.

The wakeup sequence of the system of FIG. 3 is the same as that of FIG. 2, except that in the operational mode of FIG. 3, since no disable signal DIS is supplied to the WUC converter, it continues to operate together with the main converter MC. The $V_{OUT}$ from the main converter is separate from the logic voltage used for outputs from the Main Controller, Contr, which makes the system more versatile, but at the cost of an additional inductor. One disadvantage is that the lower efficiency first mode converter, WUC, is always in operation from the low input voltage source PV, which reduces the overall efficiency of the system.

Reference is now made to FIG. 4, which is a block diagram of a third implementation of the double-stage conversion and control systems. The characteristic feature of the arrangement of FIG. 4, is that unlike the implementation of FIG. 3, the WUC is able to switch over to the higher voltage source, once the Main Converter has begun operation, allowing the power efficiency of the WUC to be brought up to that of the Main Converter MC. This is seen in FIG. 4 by the power supply line from the $V_{OUT}$ of the MC being applied back to the IN_HV voltage supply input of the WUC. As is seen, the WUC can therefore operate either from the low PV voltage output, IN_LV, in the start-up mode, or from the higher voltage supply IN_HV once the main controller Contr is also operating. This implementation therefore has the highest power conversion efficiency of the three exemplary implementations shown.

One of the main objectives of the presently described receivers is to provide the optimum transfer of the incident beam power, for use in the electronic product, device or storage element associated with the receiver, such loads often being referred to as the client power destination. This objective is particularly important when the received power is at a low level.

Figure 5:
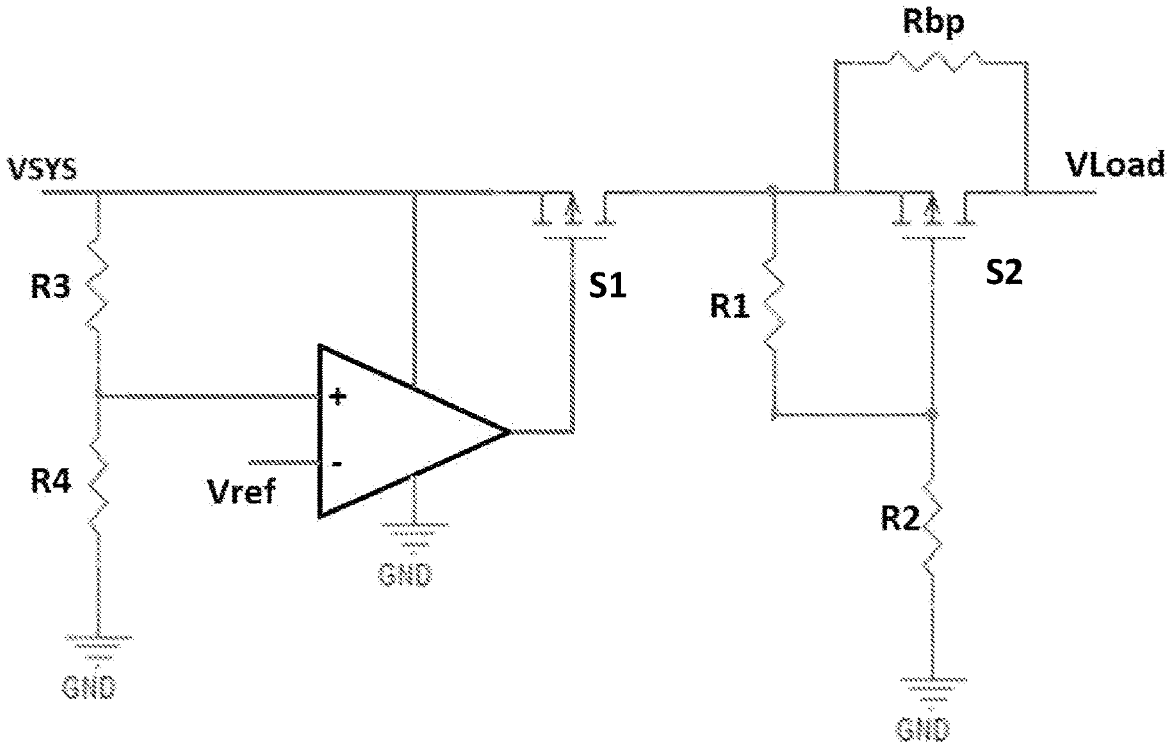
FIG. 5 shows one circuit arrangement for efficient use of the incident power, for storing in a peripheral device, especially when the incident power is low.

Reference is now made to FIG. 5, which shows an exemplary circuit arrangement for efficient use of the incident power, for storing in a peripheral device, especially when the incident power is low.

VSYS represents the voltage output VOUT by any of the systems of FIG. 2, 3 or 4. When the voltage is below a first threshold, set by R1, R2 and their associated switch S2, power to the peripheral device connected at Vload is limited by the setup of switch S2, which turns OFF when the voltage is below the set threshold, and the by-pass resistor, $R_{bp}$. However, a "keep-alive" current always continues to be supplied to Vload through $R_{bp}$. Vload may be a battery, a battery charger, a capacitor, a super capacitor or any user device. This keep-alive current is especially useful for instance, in maintaining power to a memory chip.

The voltage from the output of the main converter VOUT of FIG. 4, is input to the circuit of FIG. 5, and generates a voltage between R3 and R4 which is proportional to VOUT. This voltage is compared to the voltage $V_{ref}$, applied to the comparator.

If the voltage between R3 and R4 is above VREF, which is a second defined threshold, the switch S1 is turned OFF, so that output power from the main converter is disconnected from the peripheral device connected at Vload, thereby avoiding damage to that peripheral device due to an applied overvoltage. The system output voltage at which the load is disconnected from the system, can be selected by selection of Vref.

In summary, this arrangement thus ensures that when the voltage output at VSYS is below a first threshold, a "keep-alive" current is supplied to Vload. When the voltage in VSYS is above a second threshold, the peripheral device connected to Vload is disconnected from the power source, in order to avoid damaging the load.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Furthermore, it is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A receiver for converting an optical power beam into electrical power for use by an electronic system, the receiver comprising:

a power converting element adapted to convert the optical beam power into an electrical current at a first voltage; and at least one voltage converting circuit adapted to convert the electrical current having the first voltage into a current having a second voltage higher than the first voltage, each of the at least one voltage converting circuit comprising at least one inductor and at least one switch, a first electronic switching module, and a second electronic switching module, wherein the at least one switch is continuously switched between Open and Closed positions by a signal from at least one of the first electronic switching module and the second electronic switching module, the electronic switching modules being characterized in that:

the first electronic switching module is adapted to switch the at least one switch in a first mode, at a rate and duty cycle provided by a signal generating circuit, the first electronic switching module being powered by the electric power output of the power converting element;

the second electronic switching module is adapted to switch the at least one switch in a second mode at either or both of a variable rate and a variable duty cycle provided by at least one controller according at least to the requirements of the receiver, the second electronic switching module being powered by the electric power output of the voltage converting circuit, and the second electronic switching module is adapted to begin operation only when the voltage of the current output from the voltage converting circuit exceeds a predetermined threshold.

2. A receiver according to claim 1, wherein operation of the second electronic switching module at the second voltage enables the second electronic switching module to actuate the voltage conversion circuit at a higher conversion efficiency than the power conversion efficiency of the voltage conversion circuit operated in the first mode by the first electronic switching module.

3. A receiver according to claim 2, wherein the higher conversion efficiency of the voltage conversion circuit actuated by the second electronic switching module is achieved at least because the higher level of the second voltage compared to the first voltage enables operation of semiconductor switching devices within the second electronically operated switch module at a lower closed resistance than the closed resistance of the switching devices in the first electronic switching module.

4. A receiver according to claim 2, wherein the conversion efficiency of the voltage conversion circuit actuated by the second electronic switching module, is higher than the conversion efficiency achieved by use of the signal generating circuit in the first electronic switching module, at least because of more efficient control of the required switching parameters by use of the at least one controller to adapt the switching parameters to the receiver requirements.

5. A receiver according to claim 1, wherein the at least one inductor is common to both the first electronic switching module, and the second electronic switching module.

6. A receiver according to claim 5, wherein the at least one controller is adapted to prevent the first and second electronic switching modules from operating the at least one switch simultaneously.

7. A receiver according to claim 1, wherein the at least one controller is adapted to output a disable signal to terminate operation of the signal generating circuit of the first electronic switching module, when the second voltage exceeds a predetermined second threshold level.

8. A receiver according to claim 1, wherein the first electronic switching module, and the second electronic switching module operate with separate voltage converting circuits having separate inductors.

9. A receiver according to claim 8, wherein the use of separate inductors enables the second electronic switching modules to provide an output current at a voltage independent of the second voltage output of the voltage converter.

10. A receiver according to claim 8, wherein the use of separate inductors enables the at least one controller to provide the first electronic switching module with the second voltage, such that an increase in efficiency of operation of semiconductor switching devices within the first electronic switching modules is achieved.

11. A receiver according to claim 1, wherein the at least one controller includes a maximum power point tracking (MPPT) circuit adapted to optimize power extraction from the photovoltaic cell and the voltage converter circuit.

12. A receiver according to claim 1, further comprising a signal emitter adapted to transmit information regarding the operation of the receiver, back to a system transmitting the optical power beam, the signal emitter being:

(i) powered by the output of the voltage converting circuit; and (ii) adapted to begin operation only after the voltage of the current output from the voltage converting circuit exceeds a predetermined threshold.

13. A receiver according to claim 12 wherein the signal emitter is further adapted to begin operation only after receiving a signal from a controller.

14. A receiver according to claim 12, wherein the signal emitter is adapted to transmit a signal containing information based on data from at least one sensor measuring at least one of:

the optical beam power received;

the portion of the optical beam power absorbed by the power converting element;

the output from the power converting element;

the output from the voltage converting element; and the temperature of the power converting element.

15. A receiver according to claim 14, wherein the signal emitter is adapted to transmit the digital signal to a transmitter generating the optical power beam, such that the level of the optical power beam transmitted to the receiver can be adjusted according to the information transmitted by the signal emitter.

16. A receiver according to claim 13, wherein the signal emitter is activated by the at least one controller only when the second electronic switching module has begun to operate.

17. A receiver according to claim 16, wherein the signal emitter emits the digital signal at least once every $1/3P^{4/3}$ seconds, where P is the electrical power generated by the power converting element.

18. A method for converting an optical beam of power transmitted to a receiver, into electrical power for use by an electronic system, comprising:

converting the optical beam power into an electrical current at a first voltage by use of a power converting element;

converting the electrical current at a first voltage into a current at a second voltage higher than the first voltage, by use of at least one voltage converting circuit, each comprising an inductor and a switch, the switch being continuously switched between Open and Closed positions by a signal from at least one of a first electronic switching module and a second electronic switching module, wherein:

the first electronic switching module is adapted to switch the at least one switch in a first mode, at a rate and duty cycle provided by a signal generating circuit, the first electronic switching module being powered by the electric power output of the power converting element; and the second electronic switching module is adapted to switch the at least one switch in a second mode at either or both of a variable rate and a variable duty cycle provided by at least one controller, according at least to the requirements of the receiver, the second electronic switching module being powered by the electric power output of the voltage converting circuit, and enabling the second electronic switching module to begin operation only when the voltage of the current output from the voltage converting circuit exceeds a predetermined threshold.

19. The method according to claim 18, further comprising the steps of transmitting information regarding the operation of the receiver from a signal emitter on the receiver, back to a transmission system from which the optical beam of power was transmitted; and using the information to adjust the power of the optical beam transmitted to the receiver, wherein, the signal emitter is:

(i) powered by the output of the voltage converting circuit;

(ii) adapted to begin operation only after the voltage of the current output from the voltage converting circuit exceeds a predetermined threshold; and (iii) adapted to begin operation only after receiving a signal from the at least one controller.

20. The method according to claim 18, wherein the at least one inductor and the at least one switch comprise two inductors and two switches, an inductor and a switch being associated with each of the first electronic switching module, and the second electronic switching module, such that both are enabled to operate concurrently, one on each of a separate voltage converting circuit.

* * * * *